US010796600B2

(12) United States Patent
Buehring et al.

(10) Patent No.: US 10,796,600 B2
(45) Date of Patent: Oct. 6, 2020

(54) TRAINING DEVICE ASSEMBLY FOR IMPROVING BALL CONTROL

(71) Applicant: SensuSport UG, Karlsfeld (DE)

(72) Inventors: Nils Buehring, Munich (DE); Felix Wunner, Freising (DE); Luise Grossmann, Freising (DE)

(73) Assignee: SensuSport UG, Karlsfeld (DE)

( * ) Notice: Subject to any disclaimer, the term of this patent is extended or adjusted under 35 U.S.C. 154(b) by 0 days.

(21) Appl. No.: 15/555,020

(22) PCT Filed: Mar. 4, 2016

(86) PCT No.: PCT/EP2016/054667
§ 371 (c)(1),
(2) Date: Aug. 31, 2017

(87) PCT Pub. No.: WO2016/139349
PCT Pub. Date: Sep. 9, 2016

(65) Prior Publication Data
US 2018/0061268 A1 Mar. 1, 2018

(30) Foreign Application Priority Data

Mar. 4, 2015 (DE) .................. 10 2015 002 677

(51) Int. Cl.
*A63F 9/24* (2006.01)
*G09B 19/00* (2006.01)
*A63B 69/36* (2006.01)
*A63B 24/00* (2006.01)
(Continued)

(52) U.S. Cl.
CPC ...... *G09B 19/0038* (2013.01); *A63B 24/0003* (2013.01); *A63B 69/3608* (2013.01);
(Continued)

(58) Field of Classification Search
CPC . A63B 24/0003; A63B 69/0071; A63B 69/36; A63B 69/38
See application file for complete search history.

(56) References Cited

U.S. PATENT DOCUMENTS

| 4,848,890 A | 7/1989 | Horn | |
| 5,276,539 A * | 1/1994 | Humphrey | ............ A61B 3/063 349/116 |

(Continued)

FOREIGN PATENT DOCUMENTS

| CN | 101563642 A | 1/2009 |
| CN | 103124542 A | 5/2013 |

(Continued)

OTHER PUBLICATIONS

International Search Report for PCT/EP2016/054667, dated May 28, 2016, 3 pages. w/English translation, 4 pages.

(Continued)

*Primary Examiner* — Omkar A Deodhar
*Assistant Examiner* — Eric M Thomas
(74) *Attorney, Agent, or Firm* — Fish & Richardson P.C.

(57) ABSTRACT

A device assembly causes the concentration of a sportsperson in the course of a throwing, kicking, striking and shooting movement and/or the physical movement sequence to increasingly focus on feeling and thereby improve performance. The device assembly has a detector which transmits a signal to a pair of shutter spectacles via a transmitter at a selectable time between the beginning of a throwing, kicking, striking and shooting movement and/or the physical movement sequence and the movement phase commenced in this way. The shutter spectacles have a receiving circuit which converts the lenses of the shutter spectacles from a high transparency to a low transparency when said signal is received.

23 Claims, 5 Drawing Sheets

(51) Int. Cl.
*G02C 7/10* (2006.01)
*G02C 11/00* (2006.01)
*A63B 71/06* (2006.01)

(52) U.S. Cl.
CPC .............. *G02C 7/101* (2013.01); *G02C 7/104* (2013.01); *G02C 11/10* (2013.01); *A63B 24/0087* (2013.01); *A63B 71/0622* (2013.01); *A63B 2024/0015* (2013.01); *A63B 2024/0034* (2013.01); *A63B 2024/0093* (2013.01); *A63B 2071/0666* (2013.01); *A63B 2220/40* (2013.01); *A63B 2220/56* (2013.01); *A63B 2220/803* (2013.01); *A63B 2220/805* (2013.01); *A63B 2220/806* (2013.01); *A63B 2220/808* (2013.01); *A63B 2220/833* (2013.01); *A63B 2220/836* (2013.01); *A63B 2220/89* (2013.01); *A63B 2225/50* (2013.01)

(56) References Cited

U.S. PATENT DOCUMENTS

| | | | | |
|---|---|---|---|---|
| 6,493,254 | B1 * | 12/2002 | Alvandpour | G11C 11/412 365/154 |
| 7,193,767 | B1 * | 3/2007 | Peeri | G01J 1/04 359/290 |
| 7,959,521 | B2 * | 6/2011 | Nusbaum | A63B 69/36 473/278 |
| 2008/0151175 | A1 | 6/2008 | Gross | |
| 2013/0009059 | A1 | 1/2013 | Carus | |

FOREIGN PATENT DOCUMENTS

| | | |
|---|---|---|
| JP | H08-308979 A | 11/1996 |
| JP | 2010-211177 A | 9/2010 |
| JP | 2011-505928 A | 3/2011 |
| WO | WO 95/17227 A1 | 6/1995 |
| WO | WO2014165857 A2 | 1/2014 |

OTHER PUBLICATIONS

First Chinese Office Action for CN2016800135608 dated Nov. 20, 2018 (with English Translation), 15 pages.
Second Chinese Office Action for CN2016800135608 dated Jul. 3, 2019 (with English Translation), 8 pages.
Japanese Office Action for 2017-546895 dated Dec. 18, 2019, 10 pages.

* cited by examiner

TRAINING DEVICE ASSEMBLY FOR IMPROVING BALL CONTROL

PRIORITY CLAIM

This application is a national stage application under 35 U.S.C. § 371 of International Patent Application No. PCT/EP2016/054667, filed on Mar. 4, 2016, which claims priority to German Patent Application 10 2015 002 677.1, filed on Mar. 4, 2015, each of these applications are hereby incorporated by reference in their entirety.

The invention relates to a training device assembly, optionally for sports applications, preferably ball games, which are played using a striking implement, such as golf, tennis, baseball, and to a suitable method herefor. The invention specifically relates to an assembly for improving ball control.

A situation-appropriate sequence of a throwing, kicking, striking and/or shooting movement, which is aimed at imparting a specific trajectory and initial velocity to a ball by way of a striking implement or directly using the foot or the hand, or the situation-appropriate sequence of a movement of the body that is initiated at a specific time and, building on this, determines and influences the further movement, or the situation-appropriate relative change in the position of a piece of sports equipment by way of physical work is achievable or improvable only with continuous training.

The sportsperson controls the complex movement sequence largely subconsciously ("automatically") and gradually corrects or improves it in the course of a learning process which is based in part on the visually determined deviation of the actual ball behavior from the desired ball behavior or the actual body movement from the desired body movement, and in part on the movement sequence that is felt, in particular on tactile feedback the sportsperson receives, when the striking surface of the striking implement hits the ball,
or the ball leaves the hand or the foot of the sportsperson,
the body loses contact with the ground, in particular because of a jump, or from a defined position, or loses contact with other pieces of sports equipment,
a piece of sports equipment is moved, by way of a physical movement, out of a resting or moving, or accelerated, position.

The likewise nearly automatically performed visual tracking of the ball demands some of the sportsperson's attention to the detriment of their haptic perception. For this reason, trainers often encourage their players to close their eyes after the striking or throwing movement has been initiated in order to improve ball control.

An analogous phenomenon is known in types of sport in which a defined movement must be performed before and after the jump or the start of a desired movement sequence or the initiation of the change in position of a piece of sports equipment. Here, too, increased training success can be ascertained by closing the eyes after the jump.

However, this (repeated) closing and opening of the eyes, as an activity that is to be performed deliberately, likewise takes up some of the attention. CH 688 981 A5 discloses a transparent pair of spectacles, which is restricted in terms of field of view and which is intended to be used in the context of team sports to ensure that the wearer concentrates their visual attention on the opponent and their teammates, and not on the ball.

U.S. Pat. No. 2,045,399 A discloses a pair of spectacles having colored lenses, which are completely transparent only within the region of a small window, for golf players. The window is positioned such within the lenses that the golf player can see the ball when taking a shot only if the head posture is correct.

It is known from DE 20 2008 013 782 U1 to correct incorrect head posture, e.g. of a soccer player, by way of shutter glasses in combination with a tilt sensor. The shutter glasses delimit the field of view if the player looks "down," i.e. at the ball.

US 2011/0310318 A1 discloses shutter glasses, in which both LCD lenses are switchable between a transparent and a semi-transparent state simultaneously and with an adjustable frequency and an adjustable pulse-pause ratio. These shutter glasses serve for simulating a slow-motion effect when visually tracking e.g. the trajectory of a ball.

DE 20 2011 109 702 U1 discloses LCD shutter glasses for training types of team sports. An object or advantage is not mentioned. No concrete technical teaching can be gathered from the specification.

DE 41 39 275 C1 discloses an assembly of a video camera with a monitor that is located, in the manner of spectacles, in front of the eyes e.g. of a golf player. The video camera transmits the motion picture to this monitor with the result that the player sees their own movement sequence in real time. In other words, the conditioning is not aimed at feeling, but at seeing.

The invention is based on the object of providing an assembly that ensures by technical means that the sportsperson's attention in the course of a throwing, kicking, striking and/or shooting movement, and/or at the beginning of a defined movement sequence of the body or of the piece of sports equipment used, is increasingly concentrated on feeling, and as a consequence the learning or training success is improved.

This object is achieved by the assembly according to the invention by way of a detector which comprises a transmitter and triggers the transmission of a signal at a selectable time between the beginning of a movement for throwing, kicking, hitting or shooting or of the body and/or of the piece of sports equipment and the flight phase of the piece of sports equipment or of the body, and by way of shutter glasses having a receiving circuit which controls the transparency thereof and, during the reception of the signal of the transmitter, controls a switch from high transparency to low transparency.

Only as a precaution, reference is made to the detailed description of the shutter glasses of the above-mentioned US 2011/0310318 A1, because the hardware and software are prior art. The same is true for the controlling transmitter which communicates with the receiving circuit in wireless fashion and preferably using standardized transmission technology.

The term "shutter glasses" in the present case is not used within the meaning of a limitation to LCD shutter glasses, but is representative of spectacles whose "lenses" are switchable between high transparency and low transparency, i.e. high opacity, using electric signals.

The time at which the transmitter transmits the signal to the receiving circuit of the shutter glasses and thus brings about the switching of the shutter glasses from high transparency to low transparency can be set in a time interval between the beginning of a movement and the free flight of the ball, which begins with the shot or throw, or of the sportsperson's body or of the piece of sports equipment. The selection of the time also depends on the type of detection of the movement. In the simplest case, a trainer can trigger the transmission of the signal by way of a button at the beginning or in the course of the movement. It may be expedient, depending on the way movement is detected, alternatively on the detection of the change in the movement state of the piece of sports equipment and/or body, to equip the transmitter with a delay circuit with a fixed or adjustable delay time for transmitting the signal after detection of the movement and/or equip the receiving circuit with a delay circuit for triggering the switching from high transparency to low transparency.

However, the invention can also be used in other sports in which a change of the sportsperson's body position, or of a piece of sports equipment, out of a defined orientation takes place at a defined time.

The invention specifically relates to an assembly for improving the control over movement and/or sports equipment for throwing, kicking, hitting and/or shooting.

The term "low transparency" is to be understood to mean that the sportsperson in this state of the shutter glasses can only dimly view the environment and in particular the trajectory of the piece of sports equipment or their own body movement, or their field of view is completely darkened.

The receiving circuit can control at least the switch from high to low transparency in a continuous manner, instead of abruptly, in order to prevent an abrupt light/dark change that distracts the sportsperson from the kinesthetic and tactile feedback. The receiving circuit can also control the reverse change from dark to light in a continuous manner and thus reduce or avoid the effect of glare.

The receiving circuit of the shutter glasses can switch the latter, after the switch from high transparency to low transparency, back to high transparency with a settable delay. Alternatively or additionally, the shutter glasses can comprise a button for manually triggering the switch back.

In the instant of switching back from low transparency to high transparency, the sportsperson's pupils are still dilated and therefore particularly sensitive to UV radiation. For this reason, the viewing windows ("lenses") of the shutter glasses preferably comprise UV filters, e.g. in the form of a UV-absorbing and/or reflective coating.

The shutter glasses can additionally comprise a feedback channel transmitter, and the transmitter can comprise a receiving module, so that the feedback channel transmitter can transmit the transparency state of the shutter glasses to the transmitter. Depending on the transparency state of the shutter glasses, it is possible in this way to set the transmitter into a locked state for a given or an adjustable time period. This largely prevents disturbing influences from the environment, e.g. another sportsperson situated in the vicinity, from triggering a switch of the shutter glasses.

The detector of the assembly according to the invention can be a motion detector which reacts to a preset or preselectable phase of the movement of the sportsperson or their piece of sports equipment.

This motion detector can be a camera, which compares the sequence of the movement over time up to a first portion of the flight phase of the body or of the piece of sports equipment to a stored sequence by way of digital image processing, and triggers the transmission of the signal if or when a preset match occurs.

Alternatively, the motion detector can be a passive optical detector, which preferably has a limited field of view that is matched to the respective sport and reacts to the change in the received intensity of visible or infrared (light) radiation in connection with the movement and/or the movement of the piece of sports equipment. Once again depending on the type of sport, materials (such as adhesive films) or color with a particularly high reflectivity can be attached e.g. to a glove, a shoe, a striking implement and/or the ball in order to increase the reliability of the detection.

In a further embodiment, the motion detector can be an active detector operating according to the light barrier principle, in particular in the form of a reflex light barrier. Depending on the type of radiation used, the detection reliability is greater than in the case of a passive optical detector. To reduce the electric power consumption, pulsed operation is recommended. The above-mentioned use of reflective materials can also be expedient when using an active detector.

In a further embodiment, the motion detector can be an active detector according to the radar principle, in particular a Doppler radar unit. Doppler radar units for tracking the trajectory of a ball, of the body or of a piece of sports equipment are prior art.

In a further embodiment, the motion detector can be an acceleration detector. The acceleration detector can capture in particular changes in speed and directions. Piezo elements can optionally be used herefor. Acceleration sensors, which are mentioned by way of example, can here be attached to a glove, with the sensors recording rapid tilting of the hand, for example when throwing a handball. These, and the capturing of the change in speed and directions of bodies or pieces of sports equipment, are prior art.

In a particularly simple and therefore cost-effective embodiment suitable for many types of sports, the detector is an acoustic detector, which reacts to the sound pulse for example when the striking surface of a striking implement, the foot or the hand of the player hits the ball and triggers the transmission of the signal to the shutter glasses. Such an acoustic sensor can furthermore also be positioned next to the jump-off site in track and field athletics. To improve the detection reliability, the acoustic detector can comprise a directional microphone. Alternatively or additionally, the detector can comprise a filter circuit which is tuned to the smack-type sound that is characteristic e.g. of hitting a golf ball. The filter circuit can be a digital circuit that electronically processes received sound signals, compares them to a stored pattern, and, in the case of a sufficient match, triggers the transmission of the signal by the transmitter. The placement site of the acoustic detector relative to the position of the sportsperson is less critical than in the case where an optical detector or radar detector is used.

In a further configuration, the detector can also be a vibration detector, which triggers the transmission of the signal at the time an object, for example a ball, hits a piece of sports equipment, for example a striking implement, due to the resulting mechanical pulse. The vibration sensor can be installed with the signal transmitter directly at the piece of sports equipment. This type is widely used in particular in types of sport that involve rapid striking and the striking instrument taking a different path for each attempt. For example, the trajectory of the bat in baseball rarely equals the previous one, which would render capturing the time of impact of the ball difficult with the above-mentioned detector options.

In a further configuration, the detector can also be a pressure sensor, which records changes in forces acting on objects. This type of detector reacts both in the case of a pressure buildup, and in the case of a pressure drop, to initiate the transmission of the signal. This type of capturing is used, for example, in types of sports in which the piece of sports equipment is lifted, for example in the case of weightlifting. At the moment that the piece of sports equipment is lifted off the ground by the user, the pressure on the detector located between ground and sports equipment changes and transmits the signal for darkening to the shutter glasses. Further application is possible in types of sport involving throwing and/or kicking, for example if a javelin thrower allows the javelin to slide from their hand and the pressure sensor attached to the glove transmits the signal. The same is feasible in types of sport such as shotput or bowling.

In a further application, the detector can be a resistive or mechanical deformation sensor which captures stretch or compression deformations. Corresponding sensors are attached to body parts or to pieces of sports equipment, and deformations trigger the change in electric resistance. This application can be attached, for example, to gloves in basketball, and trigger the signal in the case of a predefined length change by way of tilting the hand when throwing. Furthermore, a strain sensor can be attached at the site of jump-off in broad jump and trigger the signal when this site is touched by the foot. These, and capturing the deformations of bodies, are prior art.

The detection of the triggering signal can optionally also take place by way of the recording technology integrated in a mobile device, for example a smartphone, and consequently be transmitted by the signal-transmitting elements, which are likewise integrated.

The structure and operating principle and adaptation of such detectors to the conditions in connection with the invention are already known to some degree to a person skilled in the art, and are part of the specialized knowledge of a person skilled in the art.

An exemplary embodiment of the invention suitable for training a golf player is illustrated schematically simplified in the drawing, in which.

Figure 1:
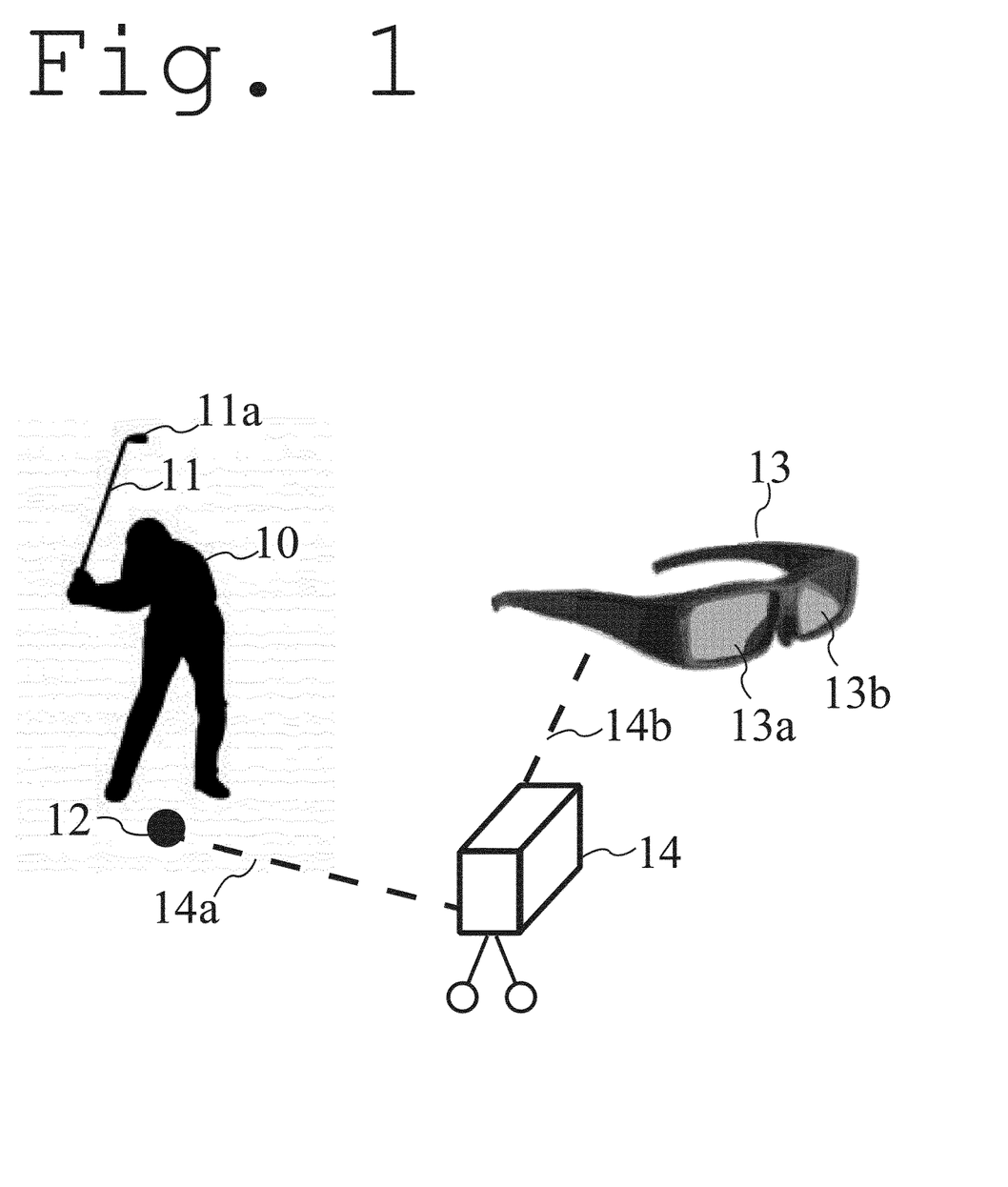
FIGS. 1 to 3: show the assembly according to the invention and the function thereof in three phases of hitting a golf ball.

In FIG. 1, the golf player 10 is in the first phase of a hitting movement which is performed by way of a golf club 11 having a club head 11*a* and is aimed at a golf ball 12 (enlarged for illustrative purposes). The player 10 is wearing LCD shutter glasses 13, enlarged in the illustration, whose lenses 13*a* and 13*b* are preferably provided with a UV protection layer. Shutter glasses 13 comprise, in the temples, the components for controlling the transparency of the lenses 13*a* and 13*b* which are known per se and therefore not illustrated (cf. also FIG. 4). The lenses in this phase of the movement are in the state of high transparency. Arranged at some distance, e.g. to the side of the golf ball 12, is a spatially movable detector 14, which is aligned with the golf ball 12, as indicated by way of the dashed line 14*a*. The detector is expediently mounted on a stand. The detector 14 comprises a transmitter (cf. FIG. 4), which can transmit a signal to the shutter glasses 13, as is indicated by the dashed line 14*b*. The detector 14 is here, for example, an acoustic detector having a directional microphone (not illustrated). As is indicated in the introductory part of the description, the detector 14 could also be e.g. an optical detector, which is either aligned with the golf ball 12 or with a specific position of the club head 11*a*, alternatively with a shoe of the player 10. The club head 11*a* or the relevant shoe of the player 10 can then be provided e.g. with a self-adhesive, releasable film strip having high reflectivity in order to increase detection reliability. When using a Doppler radar unit as a detector, the latter is not placed to the side of the golf ball,
as illustrated, but in the rearward extension of the intended direction of the trajectory of the golf ball.

Figure 2:
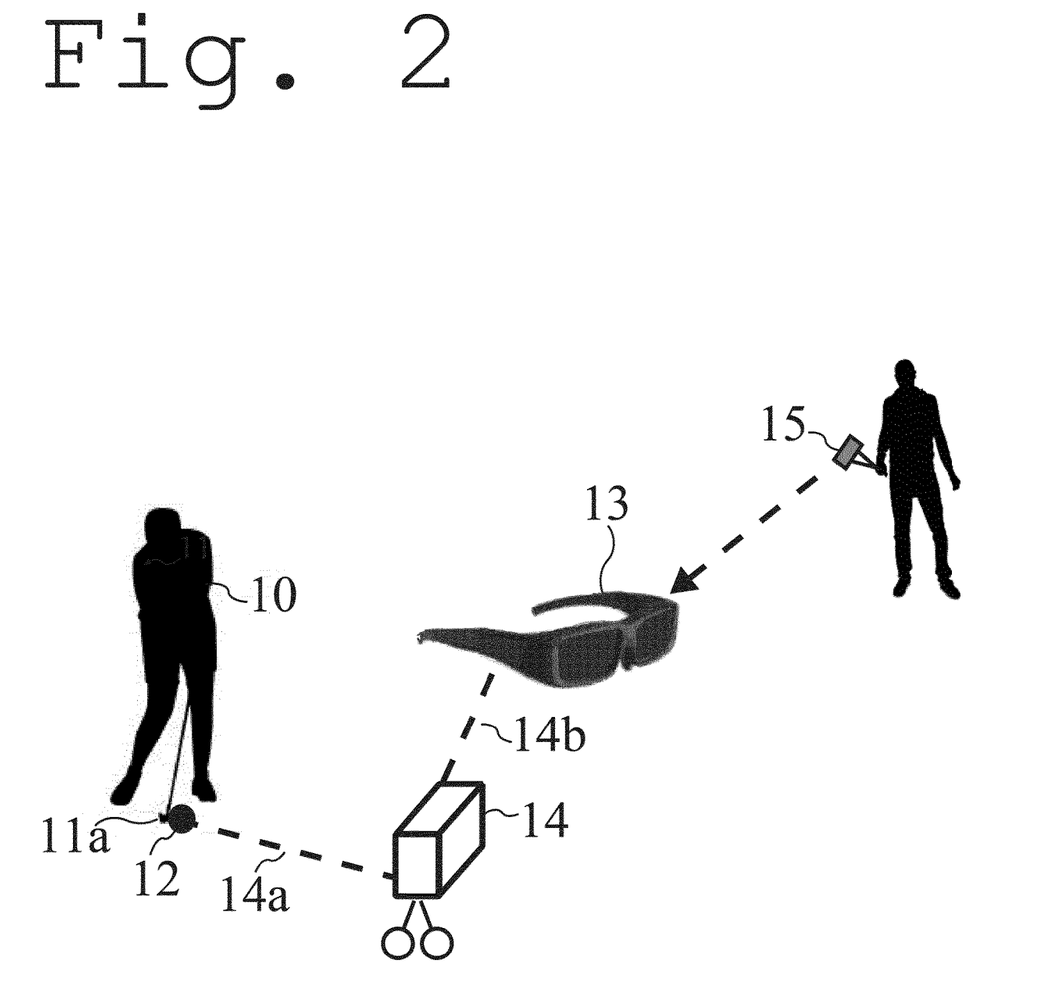

FIG. 2 shows the moment that the golf ball 12 is being hit, i.e. when the club head 11*a* hits the golf ball 12. The detector 14 reacts to the resulting sound pulse and transmits a signal to the shutter glasses 13, the receiving and control circuit of which switches, preferably in continuous manner, the lenses 13*a* and 13*b* into the indicated state of lower transparency, with the result that the player 10 cannot visually track the subsequent trajectory of the golf ball 12.

In the background in FIG. 2, the shape of a trainer is shown, who can use a small handheld transmitter 15 to transmit a signal to the shutter glasses 13 at a time selected by them and thus trigger the switching of the shutter glasses into the state of lower transparency, as an alternative to the detection process. Instead, the detector 14 could comprise a receiving module which is tuned to the handheld transmitter 15 and activates, upon receiving a signal from the handheld transmitter 15, the transmitter of the detector 14 which then triggers the switching of the shutter glasses. Which trigger is given priority can be selected by way of a switch in both variants.

Figure 3:
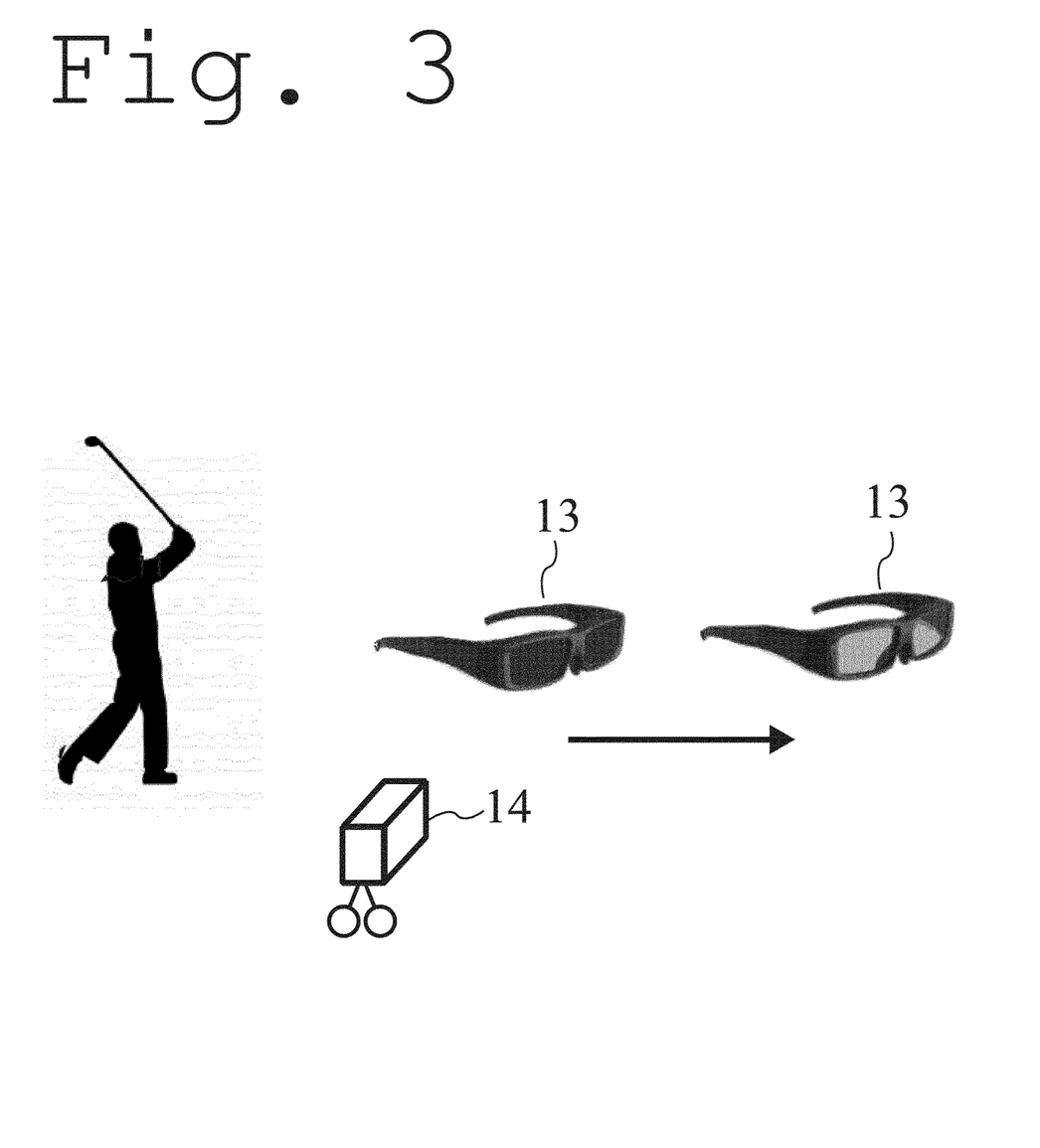

In FIG. 3, the shot with the follow-through of the club 11 is complete and, with a predetermined or settable delay time, the shutter glasses 13 automatically return to the state of high transparency illustrated on the right. The shutter glasses 13 can additionally have a button (not illustrated), which can be activated by the player to re-establish high transparency of the shutter glasses at any time.

Figure 4:
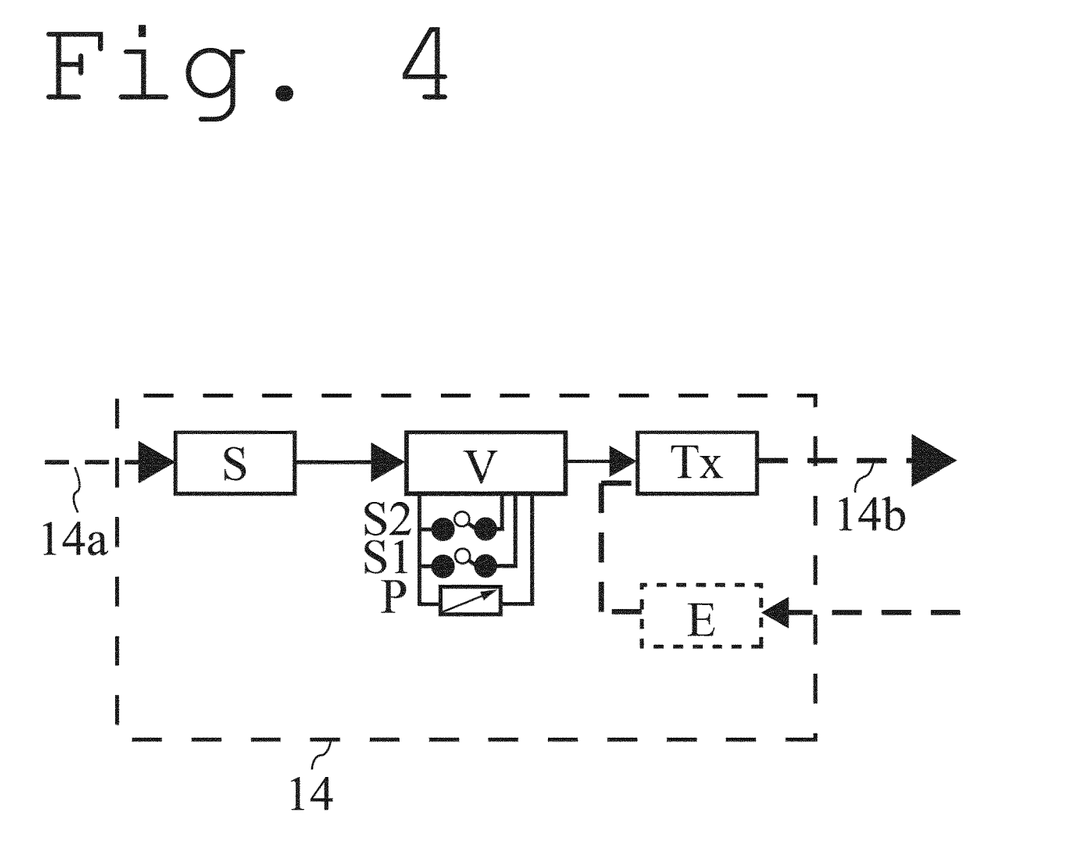
FIGS. 4 to 5: show block diagrams of the assembly.
Figure 5:
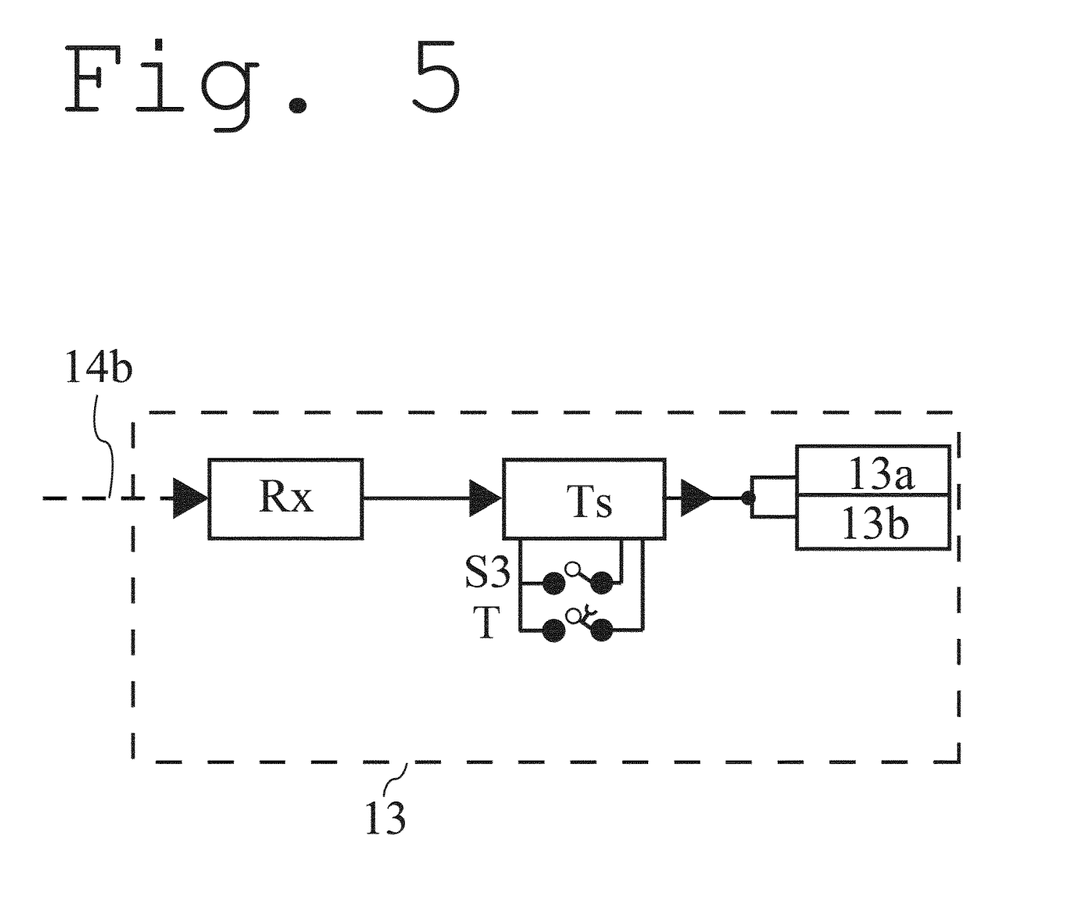

FIGS. 4 and 5 show a simplified block diagram of the essential electrical components of the detector 14 and the shutter glasses 13.

The detector 14 in principle comprises a sensor S, e.g. a directional microphone, which in the present example is aligned with the golf ball in accordance with the dashed line 14*a*. The sensor S is followed by a processing circuit V, the output of which is connected to an input of a transmitter Tx. The sound pulse caused by hitting the golf ball, illustrated in FIG. 2, brings about, by way of S and V, the activation of the transmitter Tx, which thereupon transmits via its output A a signal that is symbolized by the dashed line 14*b* (cf. FIGS. 1 to 3). The transmitter Tx can operate e.g. according to the Wi-Fi, RFID, Bluetooth or the DECT communication protocol, and in accordance with further signal transmission methods known from the prior art. The processing circuit V comprises a switchable delay circuit, which, if desired, activates the transmitter Tx with a time delay with respect to the arrival of the sound pulse (or the entering into a state which is detected in another way). To this end, the delay circuit V has additional inputs for circuits S1, S2 for fixed delay times or a potentiometer P for continuously adjusting a delay time. In this way, the training conditions can be varied. The transmitter Tx optionally has a further input for the output of a receiving module E, which reacts to the signal of the handheld transmitter 15 of the trainer, illustrated in FIG. 3.

The priority switch mentioned above in connection with FIG. 2 is not illustrated.

The shutter glasses 13 comprise a receiving circuit Rx, which controls, via a transparency control circuit TS, which is connected downstream, the transparency of the lenses 13*a*, 13*b* in dependence on the indicated receipt of a signal from the transmitter 14 (indicated by the dashed line 14*b*) or the handheld transmitter 15, specifically switches from high transparency to low transparency, and switches back to high transparency with a delay that is selectable or adjustable by way of a switch S3. Switching back can also be triggered by way of a button T located on the shutter glasses.

Both the shutter glasses 13 and the detector 14 have an energy source each (e.g. battery or rechargeable battery), an on/off switch, and at least one antenna. These components are known and therefore not illustrated.

The invention claimed is:

1. An assembly for improving the control over a device for throwing, kicking, hitting and/or shooting and/or over the physical motion sequence, having
a receiving circuit to receive a triggering signal;
a transmitter operable to send the triggering signal to the receiving circuit;
a detector, which comprises the transmitter and triggers, at a selectable time starting at the beginning of a throwing, kicking, hitting and/or shooting movement or at a selectable time of the change in the position of a training device, the transmission of the triggering signal, and
shutter glasses incorporating the receiving circuit, which controls the transparency thereof and controls a switch from high transparency to low transparency when the triggering signal is received from the transmitter.

2. The assembly as claimed in claim 1 wherein
the detector triggers, at a selectable time of the change in the position of the training device, the transmission of the triggering signal.

3. The assembly as claimed in claim 1, characterized in that the receiving circuit controls the switching of the shutter glasses from high transparency to low transparency in a continuous manner.

4. The assembly as claimed in claim 1, characterized in that the receiving circuit switches the shutter glasses, after the switch from high transparency to low transparency, back to high transparency with a settable delay.

5. The assembly as claimed in claim 1, characterized in that the lenses of the shutter glasses comprise UV filters.

6. The assembly as claimed in claim 1, characterized in that the detector is a motion detector.

7. The assembly as claimed in claim 6, characterized in that the motion detector is a camera, which compares the sequence of the movement over time up to a first portion of the flight phase of the ball to a stored sequence by way of digital image processing, and triggers the transmission of the triggering signal if or when a preset match occurs.

8. The assembly as claimed in claim 6, characterized in that the motion detector is a passive optical detector.

9. The assembly as claimed in claim 6, characterized in that the motion detector is an active detector in accordance with the light barrier principle.

10. The assembly as claimed in claim 6, characterized in that the motion detector is an active detector in accordance with the radar principle, in particular a Doppler radar unit.

11. The assembly as claimed in claim 6, characterized in that the motion detector is an acceleration sensor, which records changes in movement speeds and/or directions.

12. The assembly as claimed in claim 1, characterized in that the detector is an acoustic detector which reacts to the sound pulse when the striking surface of a striking implement, the foot or the hand of the player hits the ball and triggers the transmission of the signal.

13. The assembly as claimed in claim 1, characterized in that the motion detector is a vibration detector, which records mechanical pulses.

14. The assemblies claimed in claim 1, characterized in that the motion detector is a pressure sensor, which records changes in forces acting on surfaces, in particular reacts in the case of a complete pressure drop and/or increase.

15. The assembly as claimed in claim 1, characterized in that the motion detector is a deformation sensor, which records changes in elements in the case of expansion or compression.

16. The assembly as claimed in claim 1, characterized in that the transmission of the triggering signal is able to be triggered manually wirelessly by the transmitter.

17. A method for improving the physical performance using shutter glasses and a detector, preferably by way of using an assembly as claimed in claim 1, characterized in that the detector includes a transmitter, which wirelessly transmits a signal to the shutter glasses, and the shutter glasses changes transparency as a consequence.

18. The use of an assembly as claimed in claim 1 and shutter glasses which change transparency at a single time and a detector for enhancing the physical performance, which comprise the motion sequence and/or the motion sequence in connection with the use of sports equipment for
a) throwing
b) kicking
c) hitting
d) shooting
and the possible combination thereof.

19. An assembly for improving the control over a device for throwing, kicking, hitting and/or shooting and/or over the physical motion sequence, the assembly comprising:
a receiving circuit to receive a triggering signal;
a transmitter operable to send the triggering signal to the receiving circuit;
a detector which comprises the transmitter, the detector operable to trigger, at a selectable time starting at the beginning of a throwing, kicking, hitting and/or shooting movement or at a selectable time of the change in the position of a training device, the transmission of the triggering signal; and
shutter glasses incorporating the receiving circuit which controls the transparency of the shutter glasses, the receiving circuit operable to control a switch from high transparency to low transparency in response to the triggering signal from the transmitter.

20. The assembly as claimed in claim 19, wherein the receiving circuit is operable to switch the shutter glasses to high transparency after a settable delay from the switch from high transparency to low transparency.

21. The assembly as claimed in claim 19, wherein the detector is a motion detector.

22. The assembly as claimed in claim 21, wherein the motion detector is a camera operable to the sequence of the movement over time up to a first portion of the flight phase of the ball to a stored sequence by way of digital image processing, and to trigger the transmission of the triggering signal if or when a preset match occurs.

23. The assembly as claimed in claim 19, wherein the detector is an acoustic detector.

* * * * *

UNITED STATES PATENT AND TRADEMARK OFFICE
CERTIFICATE OF CORRECTION

PATENT NO. : 10,796,600 B2  
APPLICATION NO. : 15/555020  
DATED : October 6, 2020  
INVENTOR(S) : Nils Buehring, Felix Wunner and Luise Grossmann Page 1 of 1

It is certified that error appears in the above-identified patent and that said Letters Patent is hereby corrected as shown below:

In the Claims

In Column 8, Line 4, in Claim 14, delete "assemblies" and insert -- assembly --, therefor.

In Column 8, Line 19 (Approx.), in Claim 17, delete "changes" and insert -- change --, therefor.

Signed and Sealed this  
Fifth Day of January, 2021

Andrei Iancu  
*Director of the United States Patent and Trademark Office*